US012644319B2

(12) United States Patent
Li et al.

(10) Patent No.: US 12,644,319 B2
(45) Date of Patent: Jun. 2, 2026

(54) CASING LATCH STRUCTURE FOR CABINET

(71) Applicant: Delta Electronics, Inc., Taoyuan City (TW)

(72) Inventors: Yi-Syuan Li, Taoyuan City (TW); Shih-Ming Yan, Taoyuan City (TW); Ching-Chuan Hsu, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 205 days.

(21) Appl. No.: 18/612,951

(22) Filed: Mar. 21, 2024

(65) Prior Publication Data

US 2025/0116139 A1 Apr. 10, 2025

Related U.S. Application Data

(60) Provisional application No. 63/542,499, filed on Oct. 4, 2023.

(30) Foreign Application Priority Data

Feb. 26, 2024 (CN) ......................... 202410205889.0

(51) Int. Cl.

*E05C 1/10* (2006.01)
*E05B 15/04* (2006.01)
*E05C 1/00* (2006.01)

(52) U.S. Cl.

CPC ................ *E05C 1/10* (2013.01); *E05B 15/04* (2013.01); *E05C 1/002* (2013.01); *E05B 2015/0413* (2013.01)

(58) Field of Classification Search

CPC . E05C 1/00; E05C 1/004; E05C 1/006; E05C 1/02; E05C 1/06; E05C 1/04;

(Continued)

(56) References Cited

U.S. PATENT DOCUMENTS 1,036,583 A 8/1912 Diedrich
2,702,866 A * 2/1955 Anderson ............... E05C 19/10 5/100

(Continued)

FOREIGN PATENT DOCUMENTS

CN 2718171 Y 8/2005
CN 107208431 B 9/2019
TW I676882 B 11/2019

*Primary Examiner* — Kristina R Fulton
*Assistant Examiner* — Noah Horowitz
(74) *Attorney, Agent, or Firm* — KIRTON McCONKIE; Evan R. Witt

(57) ABSTRACT

A casing latch structure is disclosed and includes a casing, a main body, a clamping element, a fastening element, and an abutting element. The casing includes a first wall and a second wall perpendicular to each other, a through hole disposed on the first wall, and a sliding groove disposed on the second wall. The main body includes a clamping portion, a sliding portion and a fastened portion. The sliding portion is connected between the clamping portion and the fastened portion arranged on two opposite sides of the second wall, and received in the sliding groove. The clamping element is sleeved between the sliding portion and the fastened portion. The fastening element is engaged with the fastened portion to lock or release the clamping portion. The abutting element includes an abutting portion and an embedded portion connected to each other and corresponding to the through hole and the sliding groove.

14 Claims, 11 Drawing Sheets

(58) Field of Classification Search
CPC ..... E05C 1/08; E05C 1/10; E05C 1/12; E05C 1/14; E05C 1/16; E05C 1/166; E05B 15/0053; E05B 17/20; E05B 17/2007; E05B 17/2015; E05B 17/2023; E05B 17/203; E05B 17/2046; E05B 17/2042; E05B 17/2061; E05B 17/2065; Y10T 292/0999; Y10T 292/1001; Y10T 292/1022; Y10T 292/1026; Y10T 292/1033; Y10T 292/1034; Y10T 292/426; Y10T 292/218; Y10T 292/221; Y10T 292/223; H05K 5/0217; H05K 5/0221
See application file for complete search history.

(56) References Cited

U.S. PATENT DOCUMENTS

| | | | | |
|---|---|---|---|---|
| 5,704,662 | A * | 1/1998 | Kwiatkowski | E06C 1/18<br>292/259 R |
| 5,746,455 | A * | 5/1998 | Takimoto | E05C 5/02<br>292/145 |
| 8,498,119 | B2 * | 7/2013 | Fan | E05C 1/004<br>361/724 |
| 9,284,751 | B2 * | 3/2016 | Rickman | H05K 5/0221 |
| 9,637,960 | B2 * | 5/2017 | Caruso | E05C 19/005 |
| 10,327,547 | B1 * | 6/2019 | Shih | A47B 88/48 |
| 10,729,025 | B1 * | 7/2020 | Hung | H05K 5/0217 |
| 10,934,749 | B2 * | 3/2021 | Braz | E05C 1/04 |
| 10,964,353 | B2 * | 3/2021 | Yeh | H05K 5/0221 |
| 11,926,433 | B2 * | 3/2024 | Brewster | B64D 45/0028 |
| 12,031,363 | B2 * | 7/2024 | Yeh | H05K 5/0221 |

* cited by examiner

CASING LATCH STRUCTURE FOR CABINET

CROSS-REFERENCE TO RELATED APPLICATION

This application claims the benefit of U.S. Provisional Application No. 63/542,499 filed on Oct. 4, 2023, and entitled "CASING LATCH STRUCTURE FOR CABINET". This application also claims priority to China Patent Application No. 202410205889.0 filed on Feb. 26, 2024. The entireties of the above-mentioned patent application are incorporated herein by reference for all purposes.

FIELD OF THE INVENTION

The present disclosure relates to a latch structure, and more particularly to a casing latch structure, which is suitable for fixing a power supply unit in a power cabinet, and capable of reducing the material costs through the design, improving the assembly difficulties, and reducing the risk of breaking components during the installation of the latch structure.

BACKGROUND OF THE INVENTION

Power supply unit (PSU) products are often integrated into a power cabinet and fixed through a latch structure. However, the latch structure used to fix the current PSU into the power cabinet is small, and it is very difficult to assemble by hand. Furthermore, the conventional latch structure has to be assembled and operated with a plastic front cover, so the cost cannot be reduced. In addition, in case of installing the PSU into the power cabinet, if the latch structure is not retracted into the front cover completely, the components of the latch structure may be broken during the insertion of the PSU into the power cabinet.

On the other hand, the conventional latch structure is operated by toggling. The original components of the latch structure may become loose after being toggled multiple times, and there is no way to ensure that the latch mechanism is accurately positioned at a designated location of the power cabinet.

Therefore, there is a need of providing a casing latch structure suitable for fixing a power supply unit in a power cabinet, and capable of reducing the material costs through the design, improving the assembly difficulties, and reducing the risk of breaking components during the installation of the latch structure, so as to obviate the drawbacks encountered from the prior arts.

SUMMARY OF THE INVENTION

An object of the present disclosure is to provide a casing latch structure suitable for fixing a power supply unit in a power cabinet. It allows reducing the material costs through the design, improving the assembly difficulties, and reducing the risk of breaking components during the installation of the latch structure.

Another object of the present disclosure is to provide a casing latch structure suitable for fixing a power supply unit in a power cabinet. The L-shaped abutting element is installed on a main body by using an insert molding process, and an integrated design is formed, so as to simplify the assembling process of the casing latch structure. The main body of the casing latch structure can be loosened or tightened through thread adjustment, and can be directly fixed to a specific position of a metal casing in a clamping manner. It helps to solve the problems of backlash incorrectness and looseness caused by vibrations or the latch structure being toggled multiple times after the conventional power supply unit is fixed in the power cabinet. In addition, since the main body of the casing latch structure is directly fixed to the metal casing, it allows omitting the complex assembly of the conventional plastic front cover and improving the entire structural strength at the same time. With the components of the casing latch structure clamped at the specific position of the metal casing through the thread adjustment mechanism, the assembling requirements are further simplified and the assembling difficulties of the conventional latch structure are solved. Furthermore, the metal casing of the casing latch structure can be easily installed on the power supply units with different sizes, and it allows making the design flexible. Even under the condition of limited structural space, the casing latch structure can be directly integrated into the metal casing on the power supply unit. There is no need to add the costs such as the plastic front covers, so that the material costs are reduced and the assembly difficulties are solved. On the other hand, the power supply unit is fixed to the power cabinet through the displacement of the main body corresponding to the metal casing on the casing latch structure. The automatic rebound function can be added by setting a spring between the main body and the metal casing. Alternatively, it allows disposing a stop protrusion of a sliding groove, so as to ensure that the abutting element is positioned relative to the metal casing, thereby reducing the risk of breaking the abutting element during the installation of the power supply unit into the power cabinet through the casing latch structure.

In accordance with an aspect of the present disclosure, a casing latch structure is provided, and includes a casing, a main body, a clamping element, a fastening element and an abutting element. The casing includes a first wall and a second wall perpendicular to each other, a through hole disposed on the first wall, and a sliding groove disposed on the second wall. The main body is spatially corresponding the first wall and the second wall, and includes a clamping portion, a sliding portion and a fastened portion. The sliding portion is connected between the clamping portion and the fastened portion and received in the sliding groove. The clamping portion and the fastened portion are arranged on two opposite sides of the second wall, respectively. The clamping element sleeves between the sliding portion and the fastened portion. The fastening element is engaged with the fastened portion to lock or release the clamping element. In case of the clamping element being locked, the clamping element abuts against the second wall to fix the sliding portion in position relative to the sliding groove. In case of the clamping element being released, the sliding portion is allowed sliding relative to the sliding groove. The abutting element includes an abutting portion and an embedded portion. The abutting portion is spatially corresponding to the through hole on the first wall, and the embedded portion is connected to the abutting portion and spatially corresponding to the sliding groove on the second wall. In case of the sliding portion being moved toward the first wall along the sliding groove, a front end of the abutting portion passes through the through hole through on the first wall. In case of the sliding portion being moved away from the first wall along the sliding groove, the abutting portion does not protrude out of the first wall.

In an embodiment, the abutting element is a metal element, and the abutting portion and the embedded portion are connected to each other to form an L-shaped rod.

In an embodiment, the embedded portion of the abutting element is embedded in the main body through an insert molding process.

In an embodiment, the fastened portion of the main body and the fastening element are a screw thread and a nut, respectively, which engage with each other correspondingly, wherein in case of the fastening element abuts against the clamping element to press the second wall, the main body is fixed to the casing through the clamping portion and the clamping element, wherein in case of the fastening element is disengaged from the second wall to release the clamping element, the sliding portion is allowed sliding relative to the sliding groove.

In an embodiment, the main body further includes a mounting plane, which is disposed between the sliding portion and the fastened portion, and recessed relative to the sliding portion and the fastened portion, wherein the clamping element is a retaining ring, and fixed between the sliding portion and the fastened portion through the mounting plane.

In an embodiment, the sliding groove runs through the second wall, extends along a first direction, and includes a first position and a second position located at two opposite ends, respectively, and the sliding portion is allowed sliding between the first position and the second position, wherein in case of the sliding portion being moved to the first position, the abutting portion penetrates the first wall through the through hole; wherein in case of the sliding portion is moved to the second position, the abutting portion is accommodated in the casing.

In an embodiment, the casing latch structure further includes an elastic element disposed between the main body and the first wall, wherein in case of the fastening element releasing the clamping element and the sliding portion being allowed sliding relative to the sliding groove, the elastic element drives the main body to move away from the first wall, so that the sliding portion is moved to the second position.

In an embodiment, the elastic element is a compression spring, which is sleeved on an outer periphery of the abutting portion to provide an elastic restoring force between the main body and the first wall.

In an embodiment, the first wall of the casing further includes a folding plane connected to the second wall, and the folding plane has a guiding groove, wherein the guiding groove includes an opening facing a direction away from the second wall, and an end aligned with the through hole, and the elastic element is located between the folding plane and the main body.

In an embodiment, the sliding groove further includes a stop protrusion disposed between the first position and the second position.

In an embodiment, a step structure is formed between the clamping portion and the sliding portion.

In an embodiment, the embedded portion of the abutting element runs through the clamping portion, the sliding portion and at least a part of the fastened portion of the main body.

In an embodiment, the first wall is a lateral wall of the casing, and the second wall is a front wall of the cashing.

In an embodiment, the first wall of the casing further includes a folding plane connected to the second wall, and the folding plane has a guiding groove, wherein the guiding groove includes an opening facing a direction away from the second wall, and an end aligned with the through hole.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
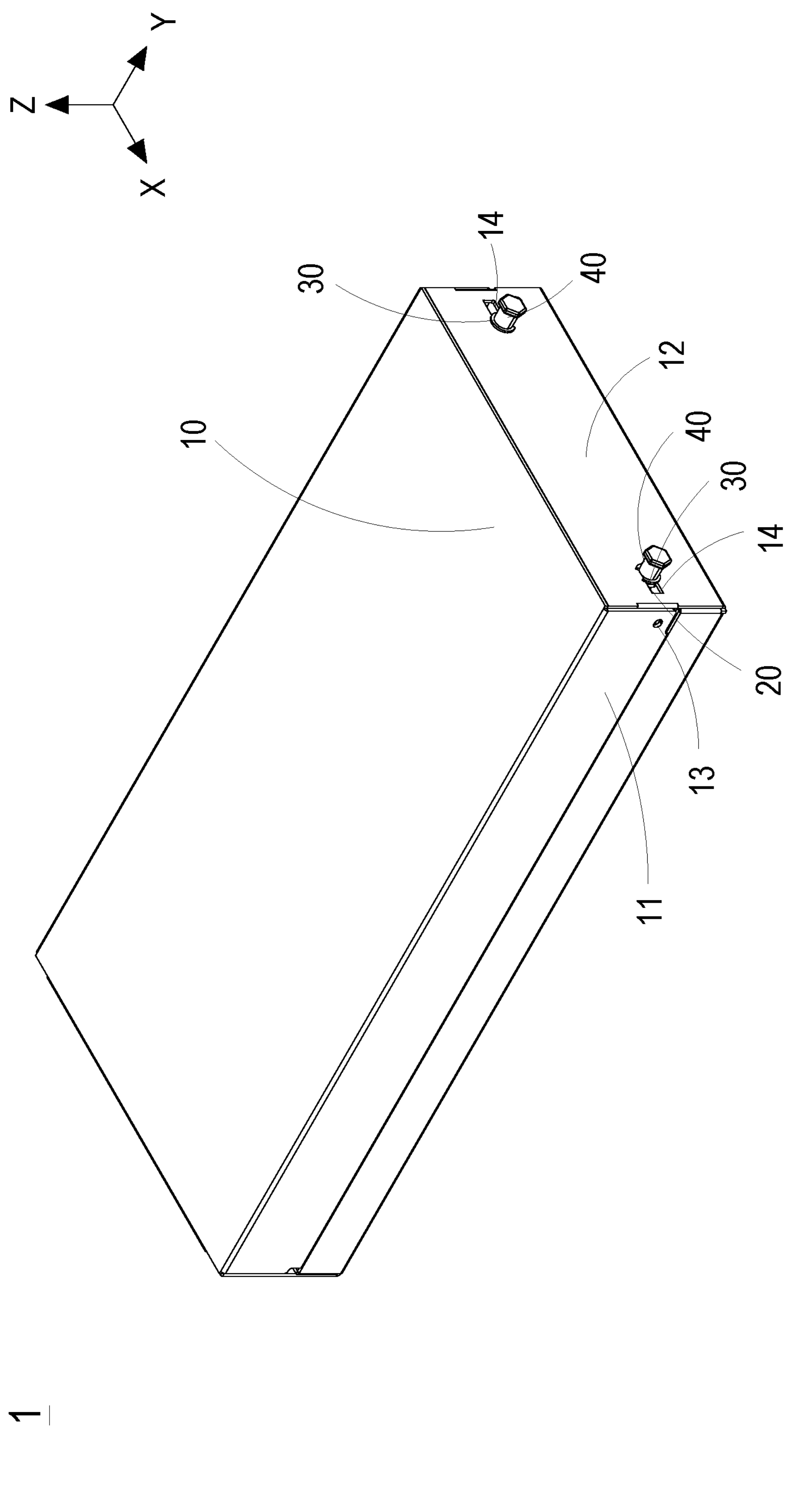
FIG. 1 is a perspective view illustrating a casing latch structure according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
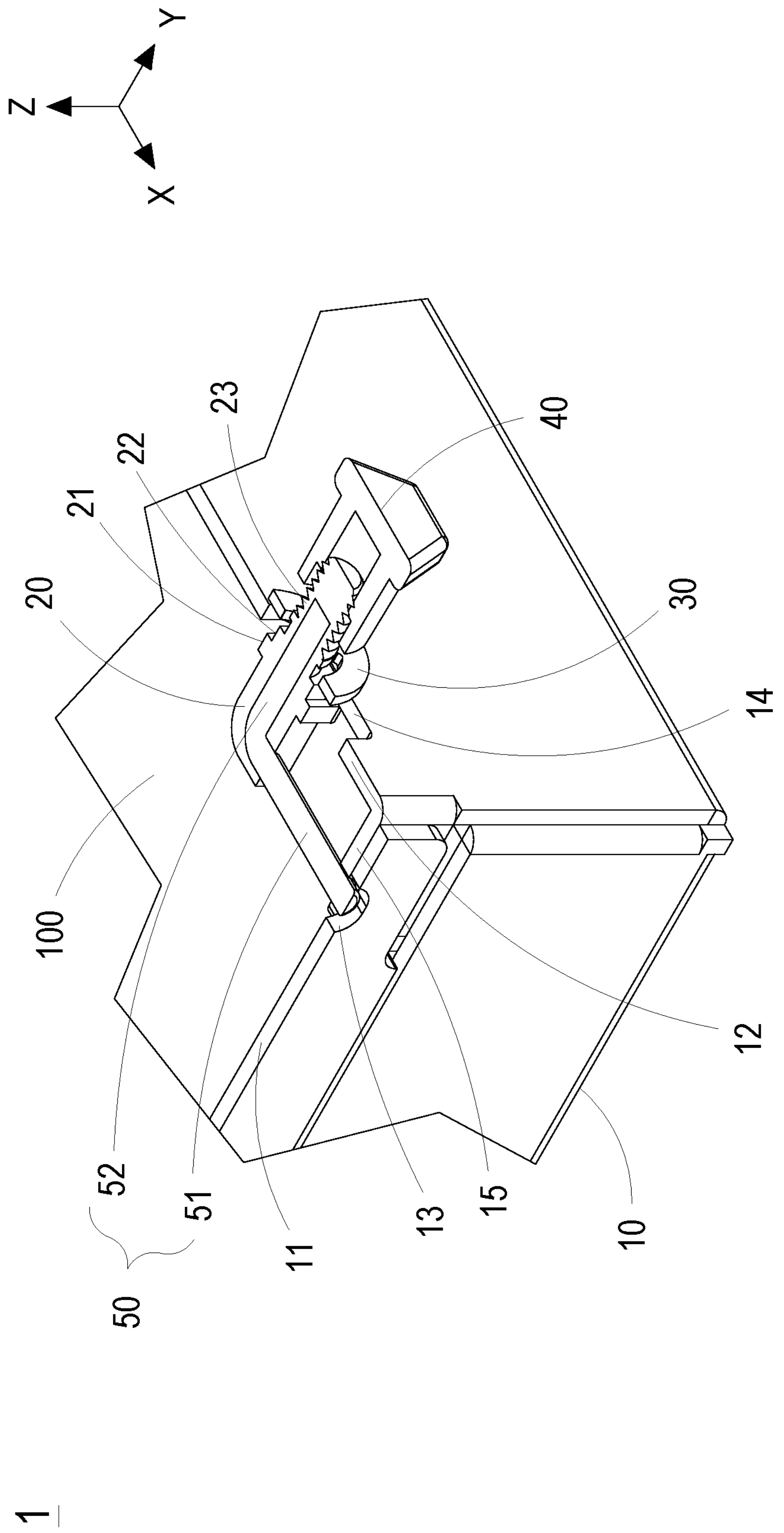
FIG. 2 is a partial cross-sectional structural view illustrating the casing latch structure according to the first embodiment of the present disclosure.
Figure 3:
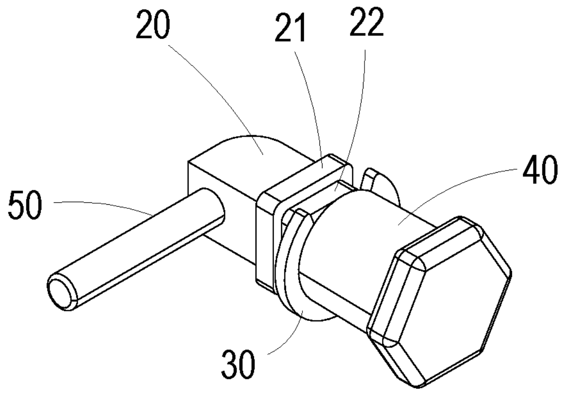
FIG. 3 is a structural diagram illustrating the components detached from the casing of the casing latch structure according to the first embodiment of the present disclosure.
Figure 4:
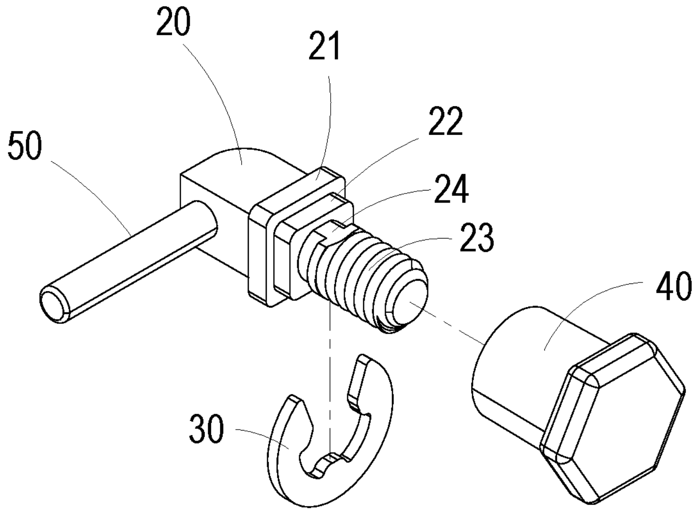
FIG. 4 is an exploded view illustrating the components detached from the casing of the casing latch structure according to the first embodiment of the present disclosure.
Figure 5:
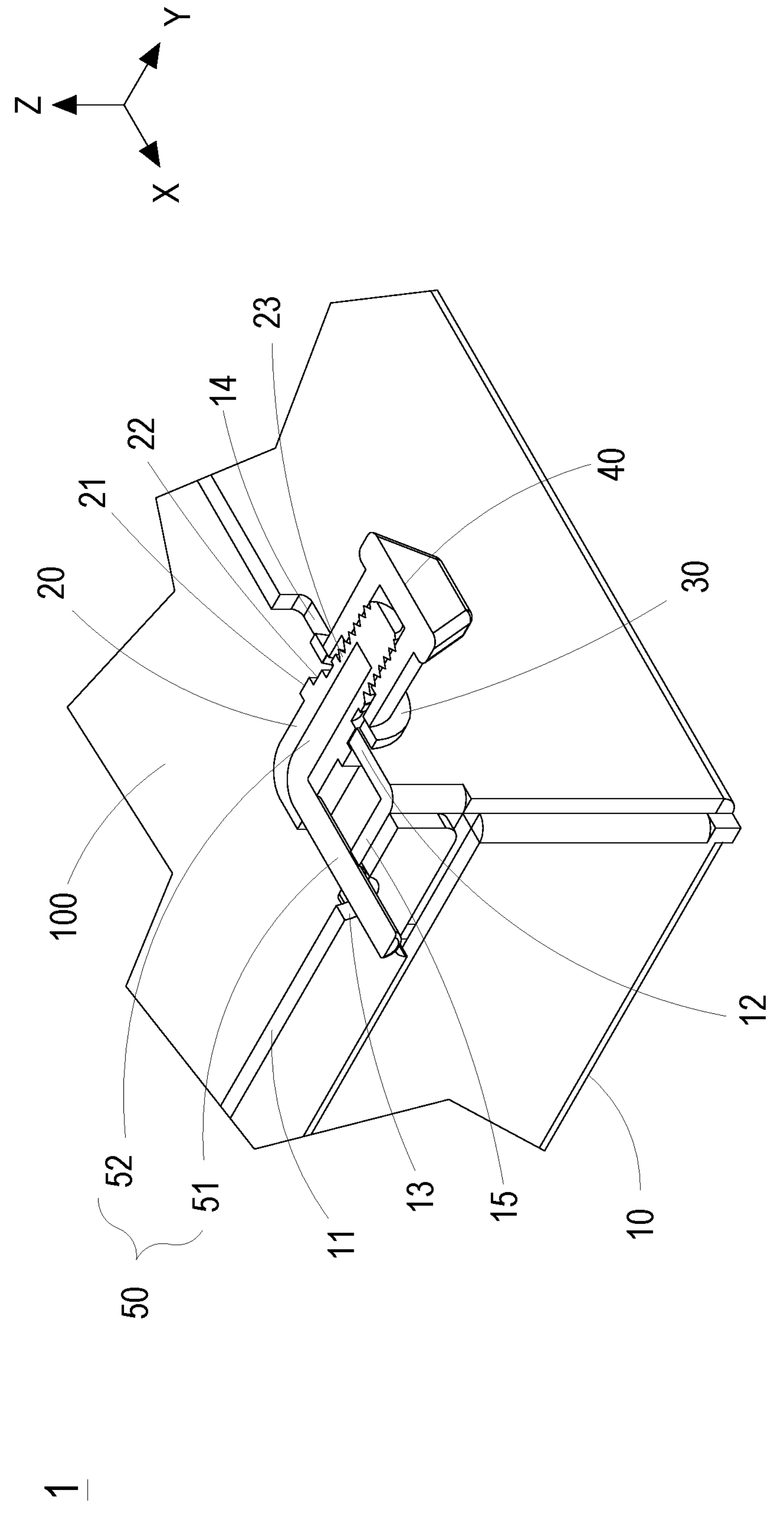
FIG. 5 is a schematic diagram illustrating the sliding portion of the main body moved to the first position of the sliding groove in the casing latch structure according to the first embodiment of the present disclosure.
Figure 6:
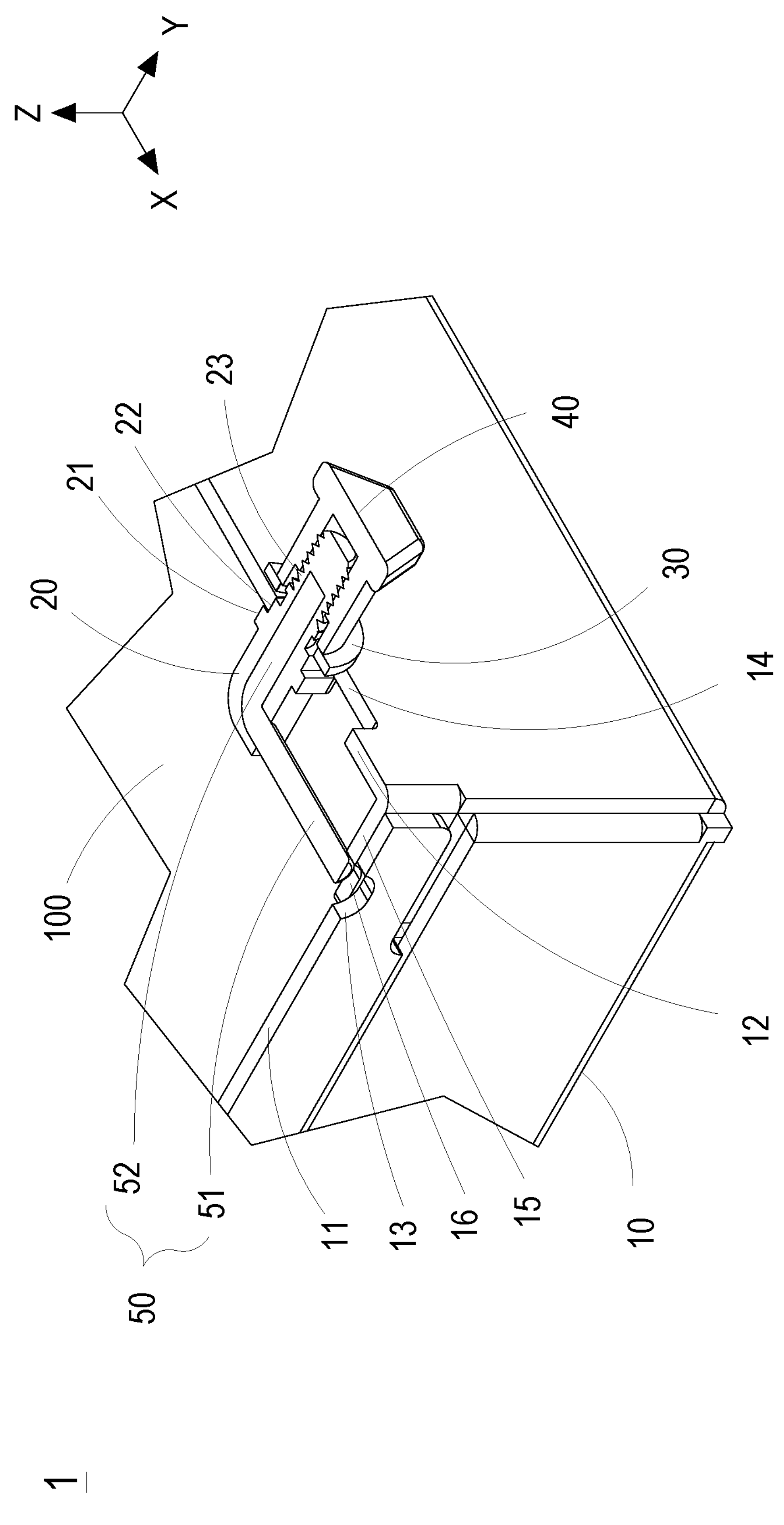
FIG. 6 is a schematic diagram illustrating the sliding portion of the main body moved to the second position of the sliding groove in the casing latch structure according to the first embodiment of the present disclosure.

FIG. 1 is a perspective view illustrating a casing latch structure according to a first embodiment of the present disclosure. FIG. 2 is a partial cross-sectional structural view illustrating the casing latch structure according to the first embodiment of the present disclosure. FIG. 3 is a structural diagram illustrating the components detached from the casing of the casing latch structure according to the first embodiment of the present disclosure. FIG. 4 is an exploded view illustrating the components detached from the casing of the casing latch structure according to the first embodiment of the present disclosure. FIG. 5 is a schematic diagram illustrating the sliding portion of the main body moved to the first position of the sliding groove in the casing latch structure according to the first embodiment of the present disclosure. FIG. 6 is a schematic diagram illustrating the sliding portion of the main body moved to the second position of the sliding groove in the casing latch structure according to the first embodiment of the present disclosure. Please refer to FIG. 1 to FIG. 6. In order to achieve applications such as fixing a power supply unit in a power cabinet, the present disclosure provides a casing latch structure 1 including a casing 10, a main body 20, a clamping element 30, a fastening element 40 and an abutting element 50. Preferably but not exclusively, the casing 10 is a metal casing of the power supply unit, and includes a first wall 11, a second wall 12, a through hole 13 and a sliding groove 14. Preferably but not exclusively, in the embodiment, the first wall 11 is the left lateral wall or the right lateral wall, which is connected to the second wall 12, such as the front wall. The first wall 11 and the second wall 12 are perpendicular to each other. The through hole 13 runs through the first wall 11 and is disposed on the first wall 11. The sliding groove 14 runs through the second wall 12 and is disposed on the second wall 12.

Notably, the casing latch structure 1 may include an implementation in which the left lateral wall or/and the right lateral wall is used as the first wall 11. In the following description, only the left lateral wall is used as the first wall 11, but the present disclosure is not limited thereto. In the embodiment, the main body 20 is disposed in an internal space 100 of the casing 10, and spatially corresponding to the first wall 11 and the second wall 12. Moreover, the main body 20 includes a clamping portion 21, a sliding portion 22 and a fastened portion 23. The sliding portion 22 is connected between the clamping portion 21 and the fastened portion 23, and received in the sliding groove 14 of the casing 10. The clamping portion 21 and the fastened portion 23 are arranged on two opposite sides of the second wall 12, respectively. That is, the clamping portion 21 is located inside the second wall 12, and the fastened portion 23 is located outside the second wall 12. Preferably but not exclusively, in the embodiment, the clamping element 30 is an E-shaped retaining ring, and sleeves between the sliding portion 22 and the fastened portion 23. The fastening element 40 is engaged with the fastened portion 23 of the main body 20 to lock or release the clamping element 30. In case of the clamping element 30 being locked, the clamping element 30 abuts against the second wall 12 to fix the sliding portion 22 in position relative to the sliding groove 14. In case of the clamping element 30 being released, the sliding portion 22 is allowed sliding relative to the sliding groove 14. The abutting element 50 includes an abutting portion 51 and an embedded portion 52. In the embodiment, the abutting portion 51 is spatially corresponding to the through hole 13 on the first wall 11. Moreover, the embedded portion 52 is connected to the abutting portion 51 and spatially corresponding to the sliding groove 14 on the second wall 12. In case of the sliding portion 22 allowed sliding relative to the sliding groove 14 and being moved toward the first wall 11 along the sliding groove 14, a front end of the abutting portion 51 passes through the through hole 13 on the first wall 11. Alternatively, in case of the sliding portion 22 allowed sliding relative to the sliding groove 14 and being moved away from the first wall 11 along the sliding groove 14, the abutting portion 51 does not protrude out of the first wall 11.

In the embodiment, the abutting element 50 is a metal element, and the abutting portion 51 and the embedded portion 52 are connected to each other to form an L-shaped rod. Preferably but not exclusively, the main body 20 is made of a plastic body, and the embedded portion 52 of the abutting element 50 is embedded in the main body 20 through, for example, an insert molding process, so that the clamping portion 21, the sliding portion 22 and the fastened portion 23 are formed on the main body 20 at the same time. In the embodiment, the L-shaped abutting element 50 is installed on the main body 20 by using the insert molding process, and an integrated design is formed, so as to simplify the assembling process of the casing latch structure 1. In the embodiment, a step structure is formed between the clamping portion 21 and the sliding portion 22, and it facilitates the assembly of the main body 20 and the casing 10. When the abutting element 50 and the main body 20 are integrated and assembled into the casing 10, the fastened portion 23 of the main body 20 passes through the sliding groove 14 on the second wall 12 from the internal space 100, so that the sliding portion 22 is received in the sliding groove 14. In the embodiment, the embedded portion 52 of the abutting element 50 runs through the clamping portion 21, the sliding portion 22 and at least a part of the fastened portion 23 of the main body 20, and it helps to increase the structural strength.

In the embodiment, the first wall 11 of the metal casing 10 further includes a folding plane 15 connected to the second wall 12. Moreover, the folding plane 15 has a guiding groove 16. Preferably but not exclusively, the guiding groove 16 includes an opening facing a direction (i.e., the inverse Y axial direction) away from the second wall 12, and an end aligned with the through hole 13. Thereby, the folding plane 15 and the guiding groove 16 further form a mechanism for the abutting element 50 to align the through hole 13. In case of that the abutting element 50 and the main body 20 are integrated and assembled to the casing 10 along the Y axial direction, the fastened portion 23 of the main body 20 passes through the sliding groove 14 on the second wall 12 from the internal space 100, and the front end of the abutting portion 51 is allowed sliding along the guiding groove 16, so that the sliding portion 22 is received in the sliding groove 14, and the front end of the abutting portion 51 is moved to the end of the guiding groove 16 to align with the through hole 13. Thereby, the assembling process is simplified. Certainly, the assembling method of the casing latch structure 1 of the present disclosure is not limited thereto.

Preferably but not exclusively, in the embodiment, the clamping element 30 is retaining ring. After the fastened portion 23 of the main body 20 passes through the sliding groove 14 on the second wall 12 from the internal space 100 along the Y axial direction, the clamping element 30 sleeves and is fixed between the sliding portion 22 and the fastened portion 23. In that, the sliding portion 22 is restricted to sliding in the sliding groove 14. In the embodiment, the main body 20 further includes a mounting plane 24, which is disposed between the sliding portion 22 and the fastened portion 23, and recessed relative to the sliding portion 22 and the fastened portion 23. Preferably but not exclusively, the clamping element 30 is an E-shaped retaining ring, and it is easy to fix the clamping element 30 between the sliding portion 22 and the fastened portion 23 through the mounting plane 24. With the arrangement of the mounting plane 24, it helps to optimize the assembly of the E-shaped retaining ring. Certainly, the present disclosure is not limited thereto.

Preferably but not exclusively, in the embodiment, the fastened portion 23 of the main body 20 and the fastening element 40 are a screw thread and a nut, respectively, which engage with each other correspondingly. In case of the fastening element 40 abuts against the clamping element 30 to press the second wall 12, the main body 20 is fixed to the casing 10 through the clamping portion 21 and the clamping element 30. Alternatively, in case of the fastening element 40 is disengaged from the second wall 12 to release the clamping element 30, the sliding portion 22 is allowed sliding relative to the sliding groove 14.

Notably, the main body 20 of the casing latch structure 1 can be loosened or tightened by adjusting the threaded engagement between the fastened portion 23 and the fastening element 40, and can be directly fixed to a specific position of the metal casing 10 in a clamping manner. It helps to solve the problems of backlash incorrectness and looseness caused by vibrations or the casing latch structure 1 being toggled multiple times after the conventional power supply unit is fixed in the power cabinet. In addition, since the main body 20 of the casing latch structure 1 is directly fixed to the metal casing 10, it allows omitting the complex assembly of the conventional plastic front cover and improving the entire structural strength at the same time. With the casing latch structure 1 clamped at the specific position of the metal casing 10 through the thread adjustment mechanism of the main body 20, the clamping element 30 and the fastening element 40, the assembling requirements are further simplified and the assembling difficulties of the conventional latch structure are solved.

Preferably but not exclusively, the sliding groove 14 is an elongated through hole, which runs through the second wall 12, extends along the first direction parallel to the X axis, and includes a first position and a second position located at two opposite ends, respectively. In case of that the fastening element 40 is disengaged from the second wall 12 and the clamping element 30 is released, the sliding portion 22 is allowed sliding between two opposite ends (i.e., between the first position and the second position). In the embodiment, in case of that the sliding portion 22 is allowed sliding relative to the sliding groove 14 and the sliding portion 22 is moved along the sliding groove 14 toward the first wall 11 to the first position (as shown inf FIG. 5), the abutting portion 51 penetrates the first wall 11 through the through hole 13. Thereafter, the user can operate the fastening element 40 to abut against the clamping element 30 to press the second wall 12, so that the main body 20 is fixed to the casing 10 through the clamping portion 21 and the clamping element 30, and the sliding portion 22 is locked at the first position of the sliding groove 14, as shown in FIG. 5. In the embodiment, in case of that the sliding portion 22 is allowed sliding relative to the sliding groove 14 and the sliding portion 22 is moved along the sliding groove 14 away from the first wall 11 to the second position (as shown inf FIG. 6), the abutting portion 51 does not protrude out of the first wall 11. That is, the abutting element 50 is completely accommodated in the internal space 100 of the casing 10.

Figure 7:
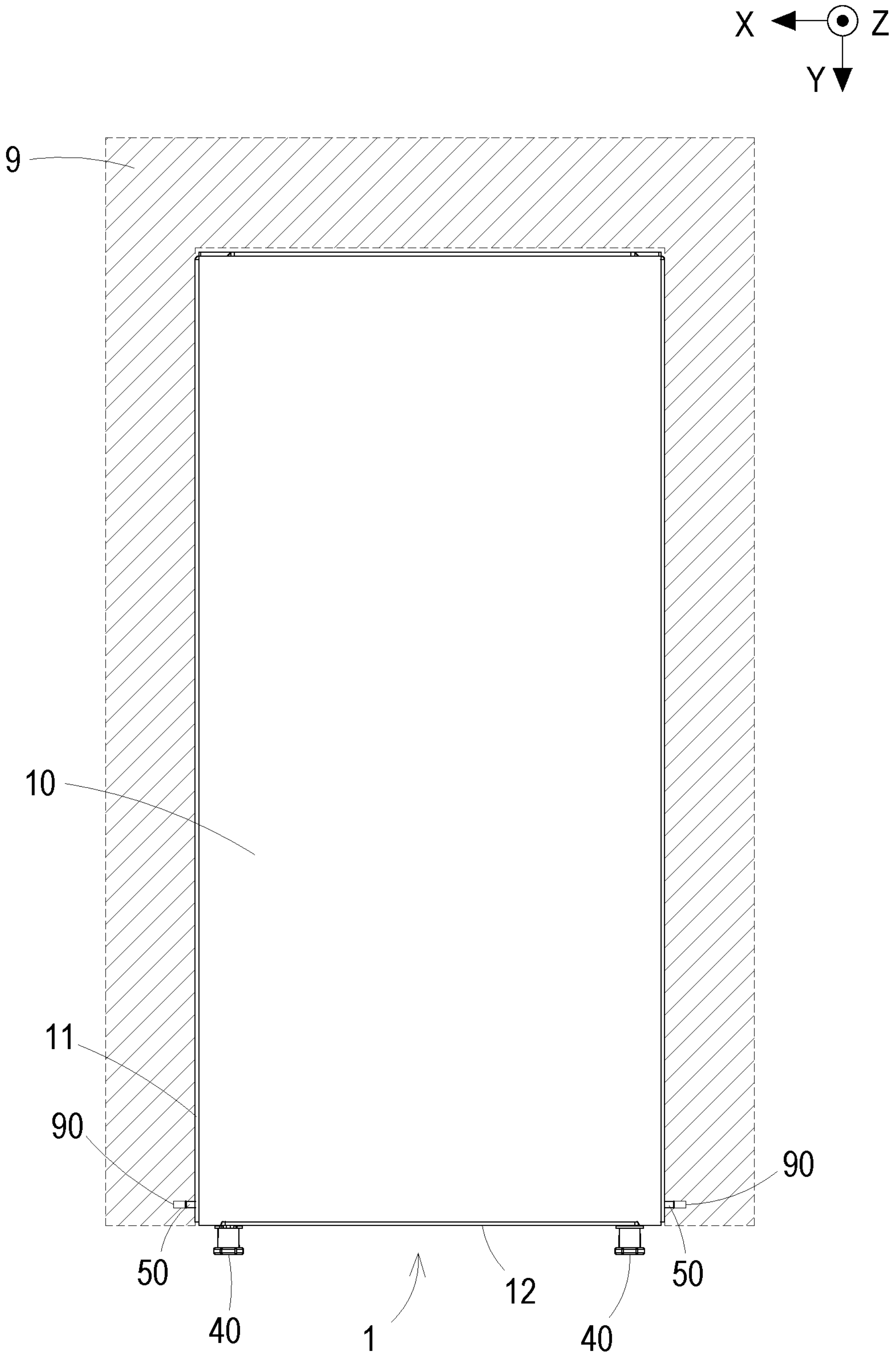
FIG. 7 is a schematic diagram illustrating the casing latch structure fixed and installed on the cabinet according to the first embodiment of the present disclosure.
Figure 8:
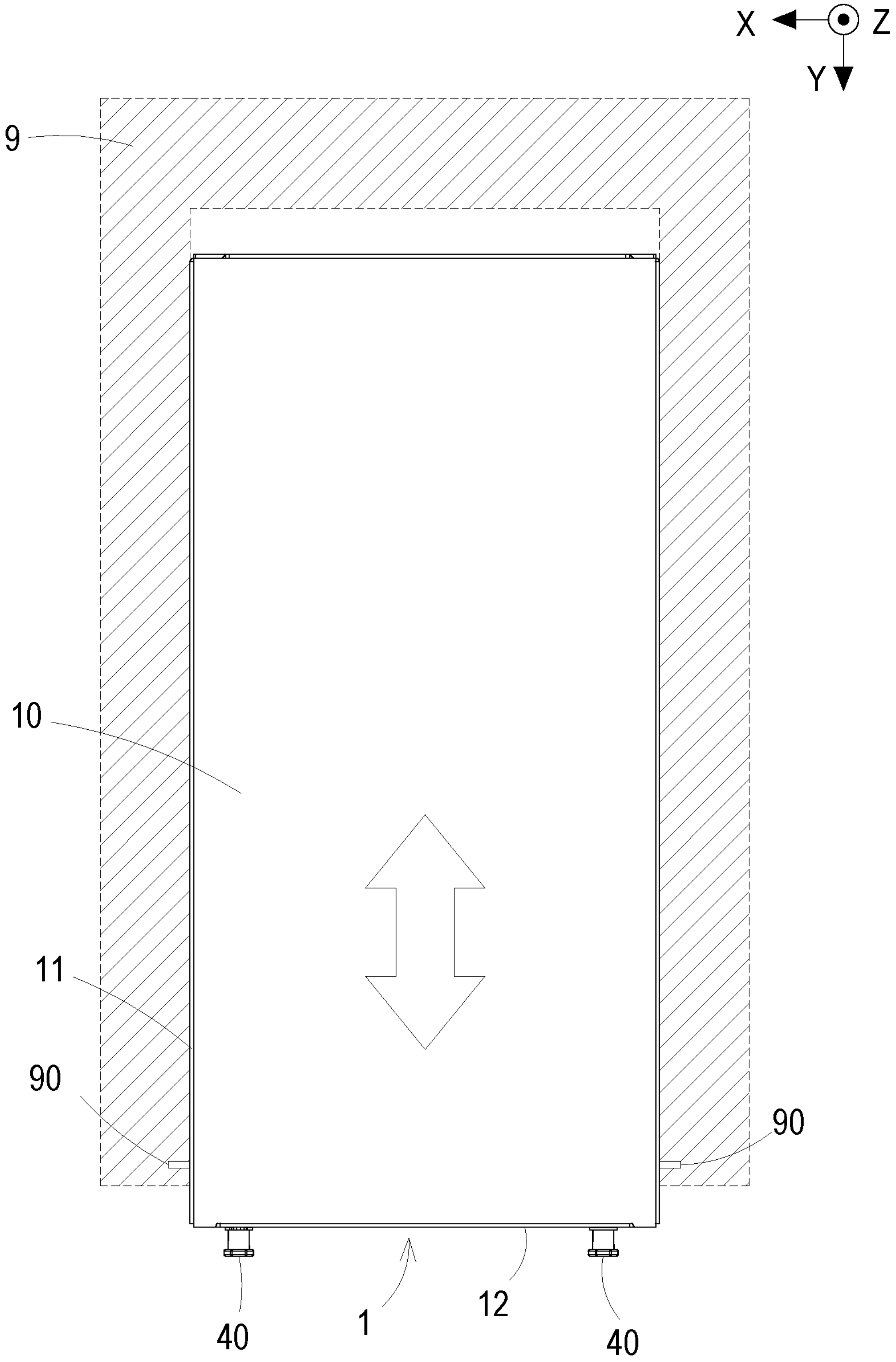
FIG. 8 is a schematic diagram illustrating the casing latch structure allowed moving relative to the cabinet according to the first embodiment of the present disclosure.

FIG. 7 is a schematic diagram illustrating the casing latch structure fixed and installed on the cabinet according to the first embodiment of the present disclosure. FIG. 8 is a schematic diagram illustrating the casing latch structure allowed moving relative to the cabinet according to the first embodiment of the present disclosure. Please refer to FIG. 1 to FIG. 8. In the embodiment, the casing latch structure 1 is suitable for fixing the power supply unit to the power cabinet 9. Preferably but not exclusively, the power supply unit is built on the casing 10. When the metal casing 10 of the casing latch structure 1 is inserted into the power cabinet 9, the user can move the sliding portion 22 relative to the sliding groove 14 through the exposed fastened portion 23 to the first position, so that the abutting portion 51 penetrates the first wall 11 through the through hole 13 and engages with the positioning hole 90 of the power cabinet 9. Thereafter, the user can operate the fastening element 40 to abut against the clamping element 30 to press the second wall 12, so that the main body 20 is fixed to the casing 10 through the clamping portion 21 and the clamping element 30, and the sliding portion 22 is locked at the first position of the sliding groove 14 (Referring to FIG. 5). Thus, the casing 10 containing the power supply unit is stably fixed in the power cabinet 9, as shown in FIG. 7. In addition, the user can release the clamping element 30 through the exposed fastening element 40, and toggle the sliding portion 22 to slide relative to the sliding groove 14 to the second position. Thereafter, the user can operate the fastening element 40 to abut against the clamping element 30 to press the second wall 12, so that the sliding portion 22 of the main body 20 is locked at the second position of the sliding groove 14 (Referring to FIG. 6). At this time, the abutting portion 51 does not protrude out of the first wall 11 and the abutting element 50 is completely accommodated in the internal space 100 of the casing 10. In that, the casing 10 containing the power supply unit can be moved relative to the power cabinet 9 to complete the disassembly or repair. Since the metal casing 10 of the casing latch structure 1 can be easily installed on the power supply units with different sizes, it makes the design flexible. Even under the condition of limited structural space, the casing latch structure 1 can be directly integrated into the metal casing 10 on the power supply unit. There is no need to add the costs such as the plastic front covers, so that the material costs are reduced and the assembly difficulties are solved. On the other hand, the power supply unit is fixed to the power cabinet 9 through the displacement of the main body 20 corresponding to the metal casing 10 on the casing latch structure 1. Furthermore, the main body 20, the clamping element 30 and the fastening element 40 are cooperated to form the thread adjustment mechanism for locking, it helps to ensure that the location of the abutting element 50 is accurately positioned relative to the casing 10, thereby reducing the risk of breaking the abutting element 50 during the installation of the power supply unit into the power cabinet 9 through the casing latch structure 1.

Figure 9:
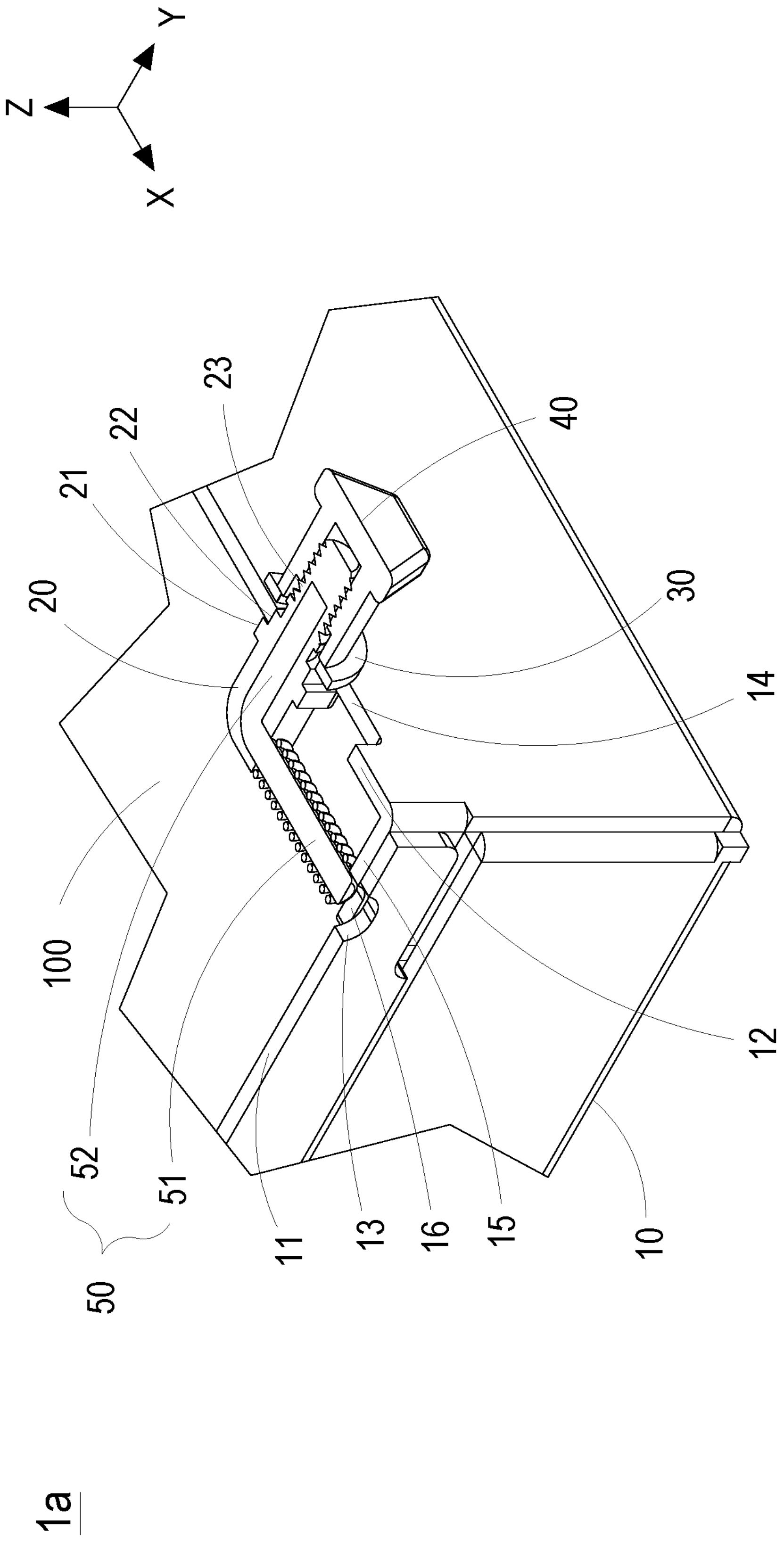
FIG. 9 is a partial cross-sectional structural view illustrating a casing latch structure according to a second embodiment of the present disclosure.
Figure 10:
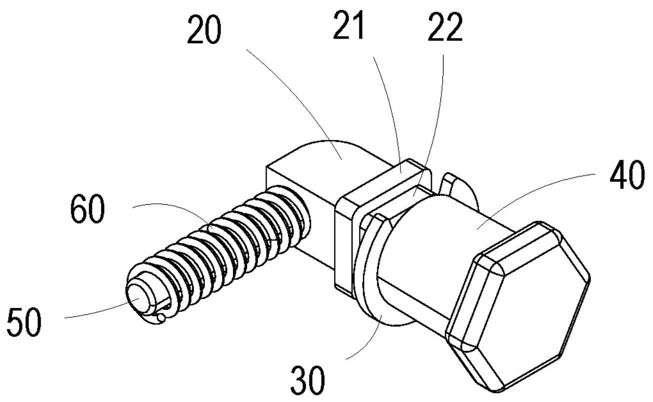
FIG. 10 is a structural diagram illustrating the components detached from the casing of the casing latch structure according to the second embodiment of the present disclosure.
Figure 11:
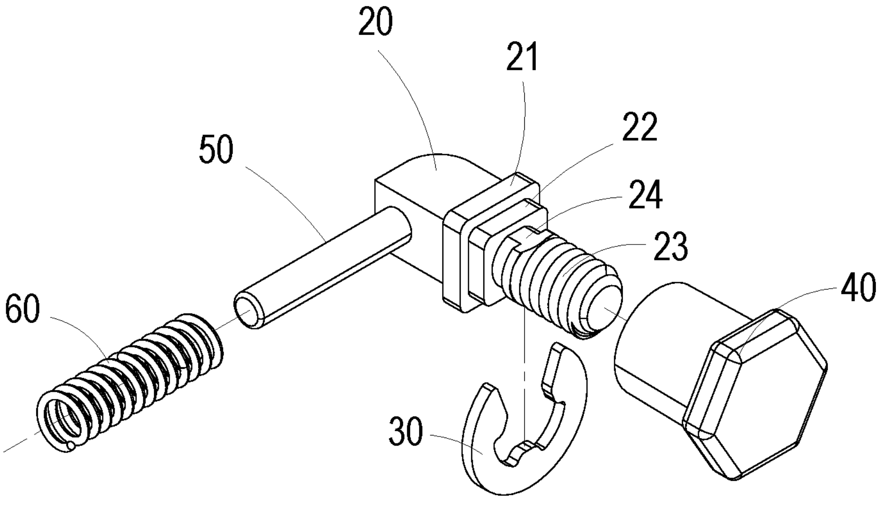
FIG. 11 is an exploded view illustrating the components detached from the casing of the casing latch structure according to the second embodiment of the present disclosure.

FIG. 9 is a partial cross-sectional structural view illustrating a casing latch structure according to a second embodiment of the present disclosure. FIG. 10 is a structural diagram illustrating the components detached from the casing of the casing latch structure according to the second embodiment of the present disclosure. FIG. 11 is an exploded view illustrating the components detached from the casing of the casing latch structure according to the second embodiment of the present disclosure. In the embodiment, the structures, elements and functions of the casing latch structure 1*a* are similar to those of the casing latch structure 1 of FIG. 1 to FIG. 8, and are not redundantly described herein. Please refer to FIG. 1 to FIG. 11. In the embodiment, the casing latch structure 1*a* further includes an elastic element 60 disposed between the main body 20 and the first wall 11, so as to provide an elastic restoring force between the main body 20 and the first wall 11. In the embodiment, the first wall 11 of the metal casing 10 further includes a folding plane 15 connected to the second wall 12. Moreover, the folding plane 15 has a guiding groove 16. Preferably but not exclusively, the opening of the guiding groove 16 faces a direction (i.e., the inverse Y axial direction) away from the second wall 12, and the end of the guiding groove 16 is aligned with the through hole 13. Thereby, the folding plane 15 and the guiding groove 16 further form a mechanism for the abutting element 50 to align the through hole 13. Furthermore, after the main body 20 is assembled to the casing 10, the elastic element 60 is constantly abutted between the first wall 11 and the main body 20. Certainly, the present disclosure is not limited thereto.

In the embodiment, in case of the fastening element 40 releasing the clamping element 30 and the sliding portion 22 being allowed sliding relative to the sliding groove 14, the elastic element 60 provides the elastic restoring force to drive the main body 20 to move away from the first wall 11, so that the sliding portion 22 is moved to the second position. It ensures that the abutting element 50 is completely accommodated in the internal space 100 of the casing 10. If the user wants to fix the casing 10 containing the power supply unit into the power cabinet 9, it allows to overcome the elastic restoring force of the elastic element 60 through the exposed fastening element 40 and toggle the sliding portion 22 to slide relative to the sliding groove 14 to the first position. Thereafter, the user can operate the fastening element 40 to abut against the clamping element 30 to press the second wall 12, so that the main body 20 is fixed to the casing 10 through the clamping portion 21 and the clamping element 30, and the sliding portion 22 is locked at the first position of the sliding groove 14 (Referring to FIG. 5). In that, the casing 10 containing the power supply unit is stably fixed in the power cabinet 9 (Referring to FIG. 7). Preferably but not exclusively, in the embodiment, the elastic element 60 is a compression spring, which is sleeved on an outer periphery of the abutting portion 51 to provide the elastic restoring force between the main body 20 and the first wall 11. Certainly, the present disclosure is not limited thereto.

From the above, it can be seen that the casing 10 containing the power supply unit can be fixed to the power cabinet 9 through the displacement of the main body 20 corresponding to the metal casing 10 on the casing latch structure 1*a*. Furthermore, the automatic rebound function can be added by setting the elastic element 60 such as a spring between the main body 20 and the casing 10. It ensures that the location of the abutting element 50 is accurately positioned relative to the casing 10, thereby reducing the risk of breaking the abutting element 50 during the installation of the power supply unit into the power cabinet 9 through the casing latch structure 1*a*.

Figure 12:
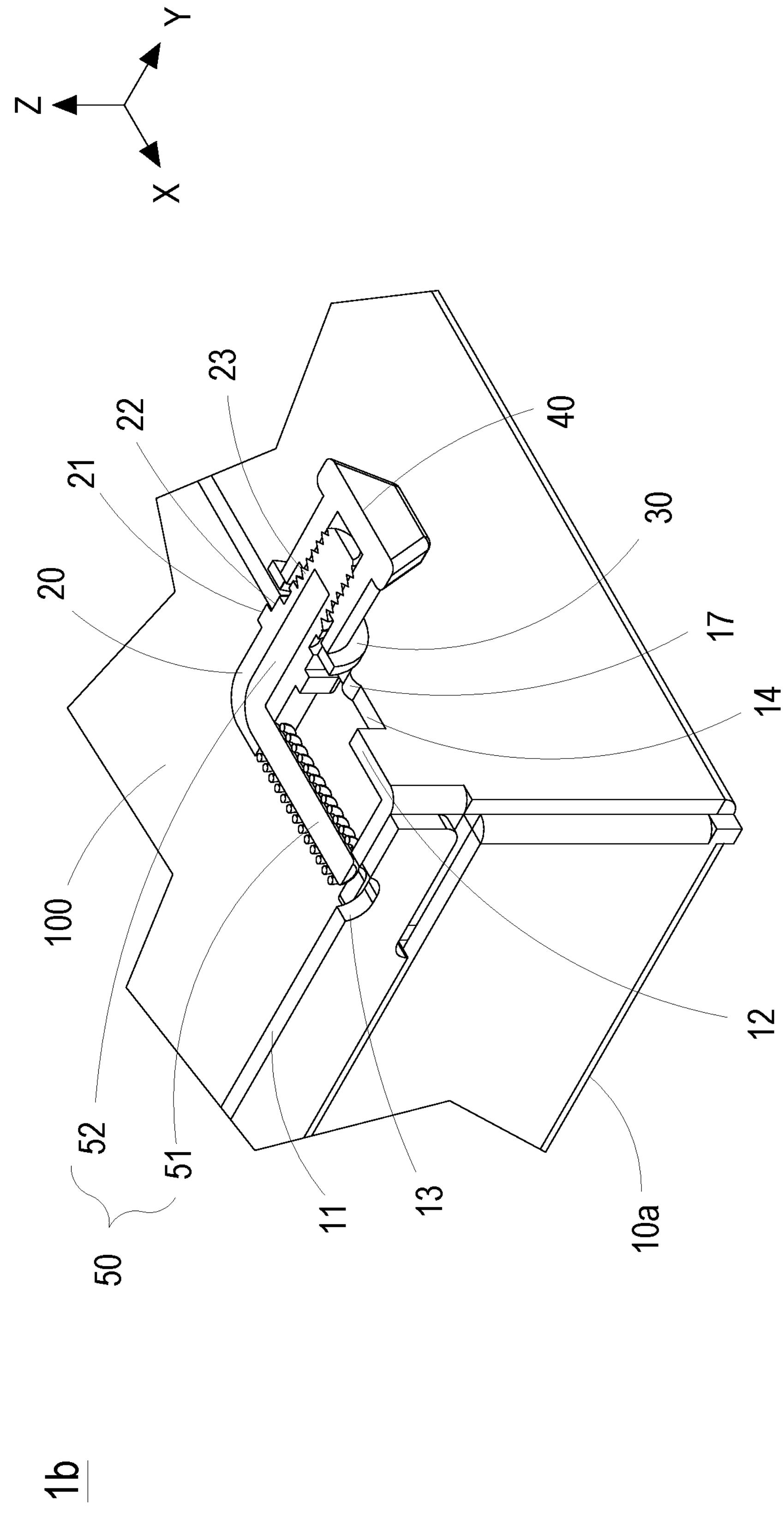
FIG. 12 is a partial cross-sectional structural view illustrating a casing latch structure according to a third embodiment of the present disclosure.
Figure 13:
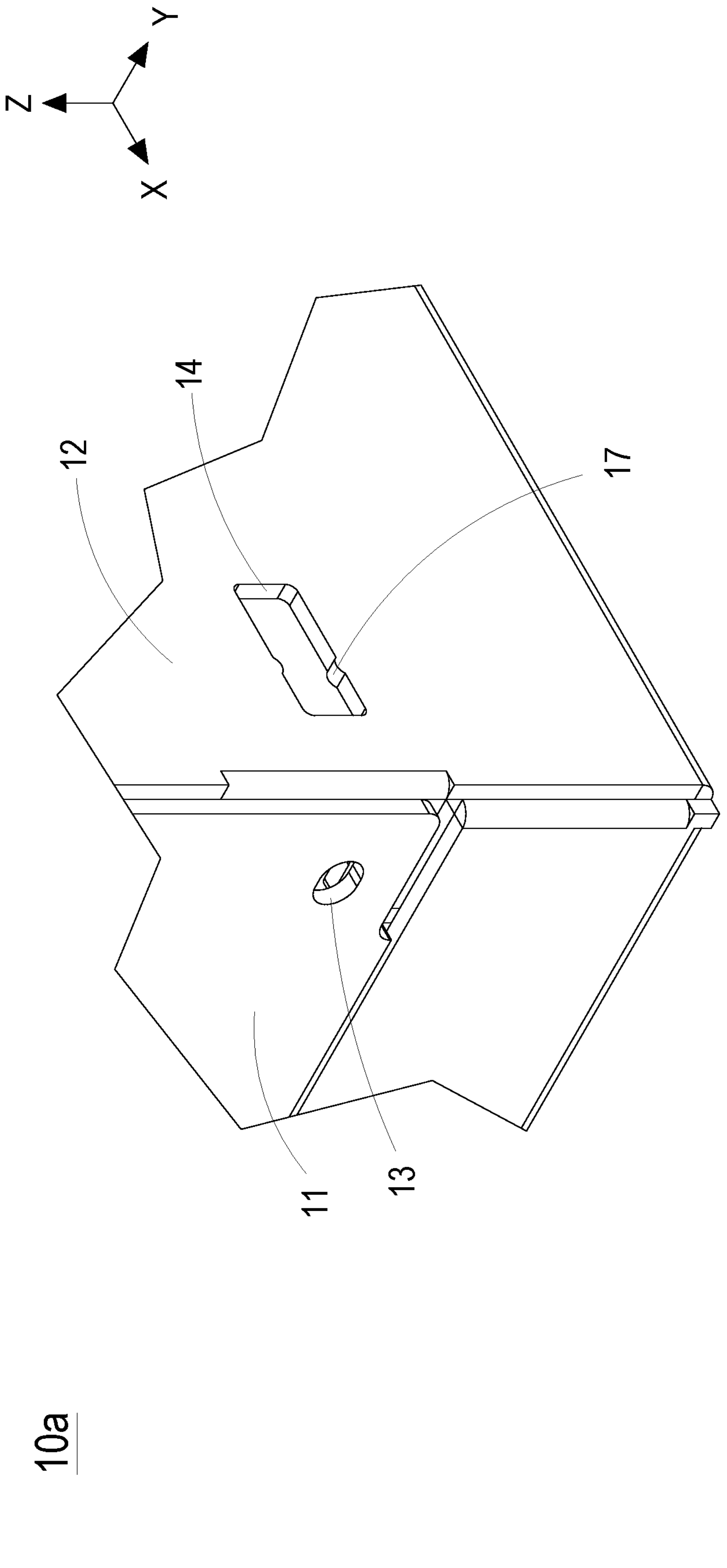
FIG. 13 is a schematic diagram illustrating the casing of the casing latch structure according to the third embodiment of the present disclosure.

FIG. 12 is a partial cross-sectional structural view illustrating a casing latch structure according to a third embodiment of the present disclosure. FIG. 13 is a schematic diagram illustrating the casing of the casing latch structure according to the third embodiment of the present disclosure. In the embodiment, the structures, elements and functions of the casing latch structure 1*b* are similar to those of the casing latch structure 1, 1*b* of FIG. 1 to FIG. 11, and are not redundantly described herein. Please refer to FIG. 1 to FIG. 13. In the embodiment, the design of the casing 10*a* of the casing latch structure 1*b* is adjustable according to the power supply units with different sizes. Moreover, the sliding groove 14 further includes a stop protrusion 17, which is disposed between two opposite ends of the sliding groove 14. That is, the stop protrusion 17 is disposed between the first position and the second position. With the design of the stop protrusion 17, it further enhances the user's feel when using the fastening element 40 or the fastened portion 23 to move and position the sliding portion 22, and helps to ensure that the location of the abutting element 50 is accurately positioned relative to the casing 10, thereby reducing the risk of breaking the abutting element 50 during the installation of the power supply unit into the power cabinet 9 through the casing latch structure 1*b*.

In summary, the present disclosure provides a casing latch structure suitable for fixing a power supply unit in a power cabinet. It allows reducing the material costs through the design, improving the assembly difficulties, and reducing the risk of breaking components during the installation of the latch structure. The L-shaped abutting element is installed on a main body by using an insert molding process, and an integrated design is formed, so as to simplify the assembling process of the casing latch structure. The main body of the casing latch structure can be loosened or tightened through thread adjustment, and can be directly fixed to a specific position of a metal casing in a clamping manner. It helps to solve the problems of backlash incorrectness and looseness caused by vibrations or the latch structure being toggled multiple times after the conventional power supply unit is fixed in the power cabinet. In addition, since the main body of the casing latch structure is directly fixed to the metal casing, it allows omitting the complex assembly of the conventional plastic front cover and improving the entire structural strength at the same time. With the components of the casing latch structure clamped at the specific position of the metal casing through the thread adjustment mechanism, the assembling requirements are further simplified and the assembling difficulties of the conventional latch structure are solved. Furthermore, the metal casing of the casing latch structure can be easily installed on the power supply units with different sizes, and it allows making the design flexible. Even under the condition of limited structural space, the casing latch structure can be directly integrated into the metal casing on the power supply unit. There is no need to add the costs such as the plastic front covers, so that the material costs are reduced and the assembly difficulties are solved. On the other hand, the power supply unit is fixed to the power cabinet through the displacement of the main body corresponding to the metal casing on the casing latch structure. The automatic rebound function can be added by setting a spring between the main body and the metal casing. Alternatively, it allows disposing a stop protrusion of a sliding groove, so as to ensure that the abutting element is positioned relative to the metal casing, thereby reducing the risk of breaking the abutting element during the installation of the power supply unit into the power cabinet through the casing latch structure.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A casing latch structure, comprising:

a casing, comprising a first wall and a second wall perpendicular to each other, a through hole disposed on the first wall, and a sliding groove disposed on the second wall;

a main body spatially corresponding to the first wall and the second wall, and comprising a clamping portion, a sliding portion and a fastened portion, wherein the sliding portion is connected between the clamping portion and the fastened portion and received in the sliding groove, wherein the clamping portion and the fastened portion are arranged on two opposite sides of the second wall, respectively;

a clamping element sleeving between the sliding portion and the fastened portion;

a fastening element engaged with the fastened portion to lock or release the clamping element, wherein in case of the clamping element being locked, the clamping element abuts against the second wall to fix the sliding portion in position relative to the sliding groove, wherein in case of the clamping element being released, the sliding portion is allowed sliding relative to the sliding groove; and an abutting element comprising an abutting portion and an embedded portion, wherein the fastening element and the abutting portion are respectively arranged on opposite sides of the second wall, wherein the abutting portion is spatially corresponding to the through hole on the first wall, and the embedded portion is connected to the abutting portion and spatially corresponding to the sliding groove on the second wall, wherein in case of the sliding portion being moved toward the first wall along the sliding groove, a front end of the abutting portion passes through the through hole on the first wall, wherein in case of the sliding portion being moved away from the first wall along the sliding groove, the abutting portion does not protrude out of the first wall.

2. The casing latch structure according to claim 1, wherein the abutting element is a metal element, and the abutting portion and the embedded portion are connected to each other to form an L-shaped rod.

3. The casing latch structure according to claim 1, wherein the embedded portion of the abutting element is embedded in the main body through an insert molding process.

4. The casing latch structure according to claim 1, wherein the fastened portion of the main body and the fastening element are a screw thread and a nut, respectively, which engage with each other correspondingly, wherein in case of the fastening element abuts against the clamping element to press the second wall, the main body is fixed to the casing through the clamping portion and the clamping element, wherein in case of the fastening element is disengaged from the second wall to release the clamping element, the sliding portion is allowed sliding relative to the sliding groove.

5. The casing latch structure according to claim 1, wherein the main body further comprises a mounting plane, which is disposed between the sliding portion and the fastened portion, and recessed relative to the sliding portion and the fastened portion, wherein the clamping element is a retaining ring, and fixed between the sliding portion and the fastened portion through the mounting plane.

6. The casing latch structure according to claim 1, wherein the sliding groove runs through the second wall, extends along a first direction, and comprises a first position and a second position located at two opposite ends, respectively, and the sliding portion is allowed sliding between the first position and the second position, wherein in case of the sliding portion being moved to the first position, the abutting portion penetrates the first wall through the through hole; wherein in case of the sliding portion is moved to the second position, the abutting portion is accommodated in the casing.

7. The casing latch structure according to claim 6, further comprising an elastic element disposed between the main body and the first wall, wherein in case of the fastening element releasing the clamping element and the sliding portion being allowed sliding relative to the sliding groove, the elastic element drives the main body to move away from the first wall, so that the sliding portion is moved to the second position.

8. The casing latch structure according to claim 7, wherein the elastic element is a compression spring, which is sleeved on an outer periphery of the abutting portion to provide an elastic restoring force between the main body and the first wall.

9. The casing latch structure according to claim 7, wherein the first wall of the casing further comprises a folding plane connected to the second wall, and the folding plane has a guiding groove, wherein the guiding groove comprises an opening facing a direction away from the second wall, and an end aligned with the through hole, and the elastic element is located between the folding plane and the main body.

10. The casing latch structure according to claim 6, wherein the sliding groove further comprises a stop protrusion disposed between the first position and the second position.

11. The casing latch structure according to claim 1, wherein a step structure is formed between the clamping portion and the sliding portion.

12. The casing latch structure according to claim 1, wherein the embedded portion of the abutting element runs through the clamping portion, the sliding portion and at least a part of the fastened portion of the main body.

13. The casing latch structure according to claim 1, wherein the first wall is a lateral wall of the casing, and the second wall is a front wall of the cashing.

14. The casing latch structure according to claim 1, wherein the first wall of the casing further comprises a folding plane connected to the second wall, and the folding plane has a guiding groove, wherein the guiding groove comprises an opening facing a direction away from the second wall, and an end aligned with the through hole.

* * * * *